United States Patent Office 3,277,758
Patented Oct. 11, 1966

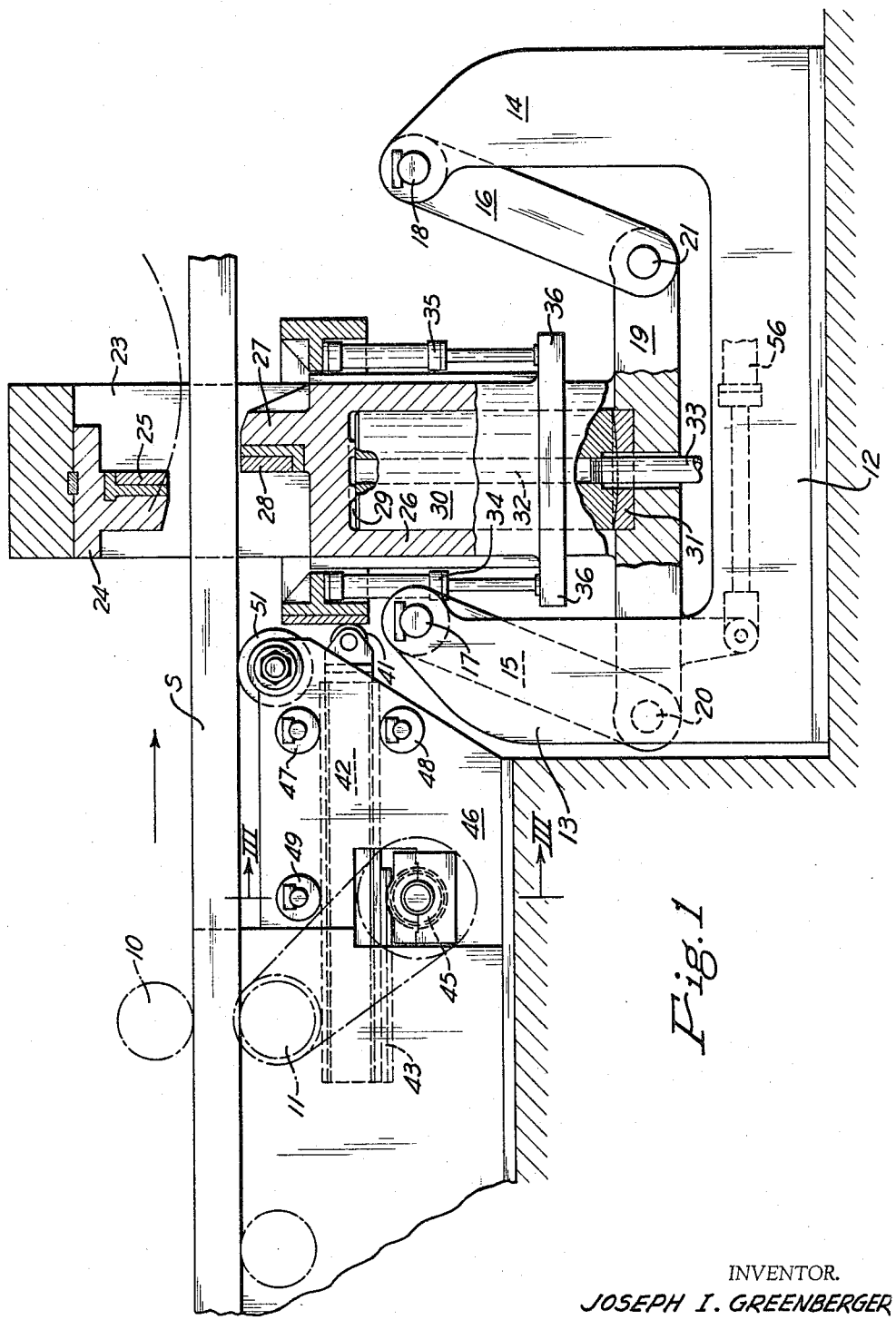

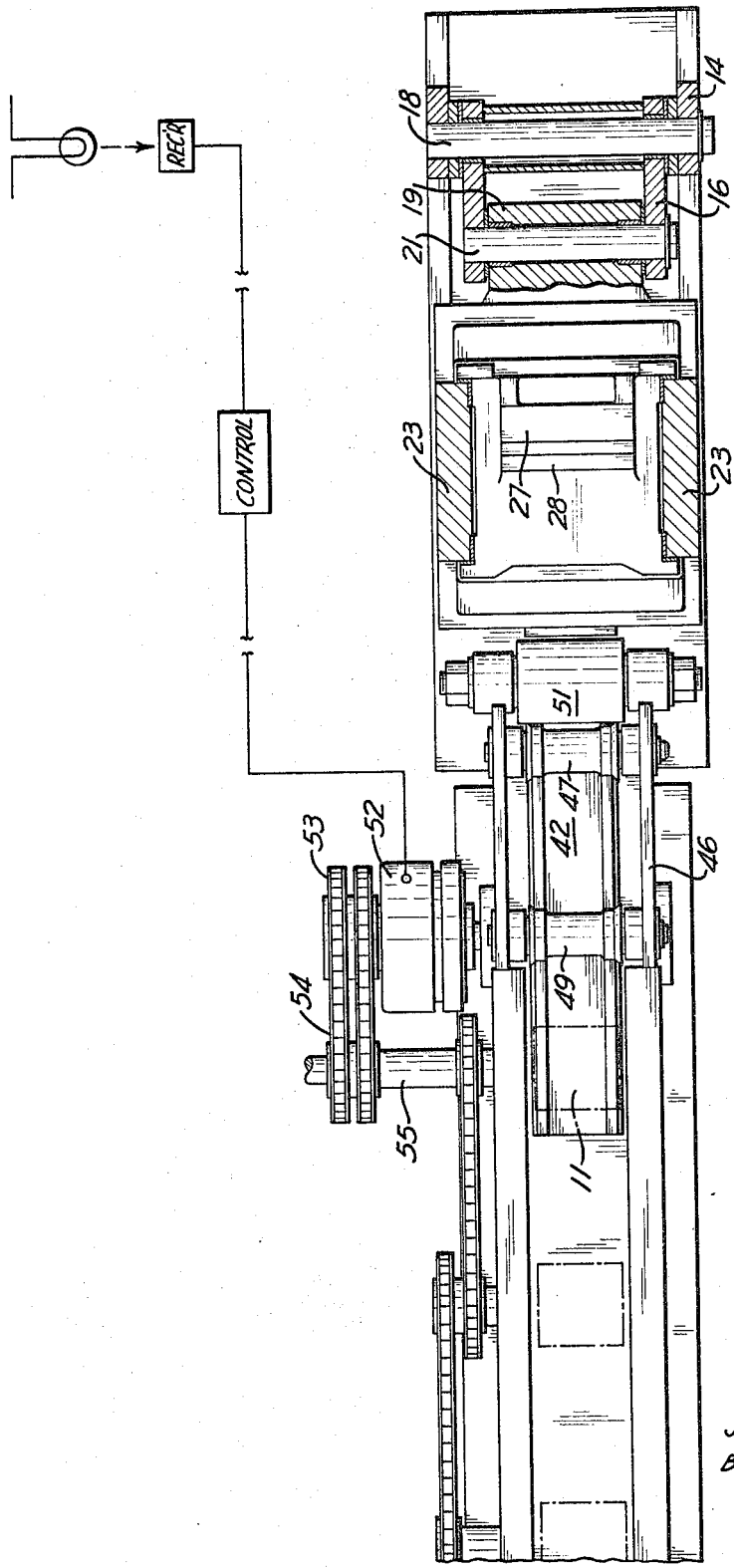

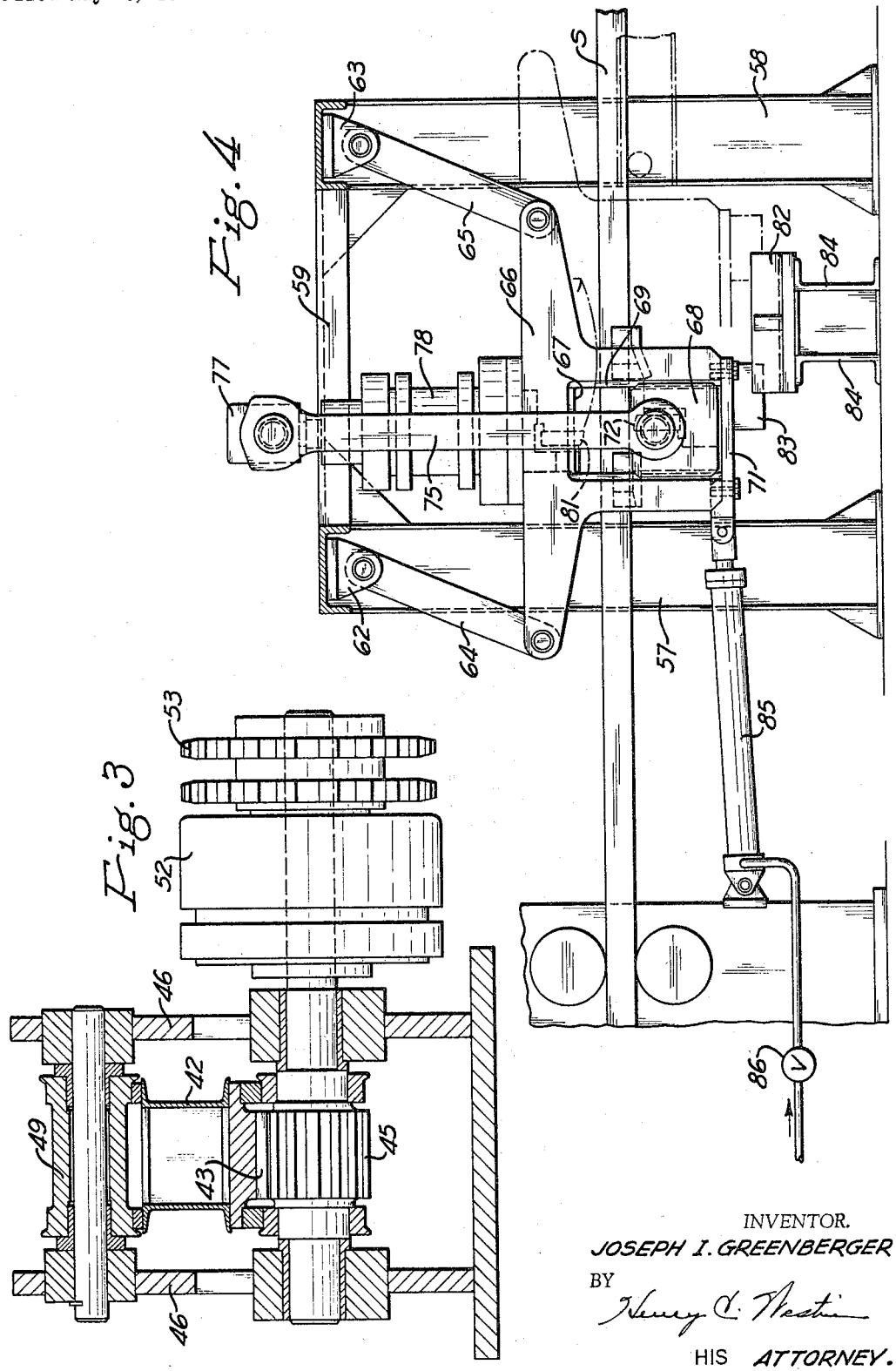

3,277,758
FLYING HYDRAULIC SHEAR CONTROLLED BY WORKPIECE FEED
Joseph Irwin Greenberger, Pittsburgh, Pa., assignor to United Engineering and Foundry Company, Pittsburgh, Pa., a corporation of Pennsylvania
Filed May 19, 1965, Ser. No. 456,998
Claims priority, application Great Britain, June 4, 1964, 23,287/64
8 Claims. (Cl. 83—295)

This invention relates to a shear adapted to sever metallic workpieces and, more particularly, to a shear designed to sever slabs, billets, blooms and the like without necessitating an interruption of the forward progress of these workpieces.

Normally, in the shearing of such workpieces, as an incident in producing them in the rolling mill plant, they are held stationary during the shearing operation. This is true not only when the workpieces are being divided or sheared into predetermined length, but also when the crop front or back end portions are being removed. Because of the need to stop the workpieces to accomplish their shearing, the shearing operation involves a considerable amount of time, sometimes to the extent of delaying the operation of the rolling mill equipment that precedes the shear. In the interest of eliminating any delay caused by the heretofore necessity of stopping the workpieces for shearing, the present invention is addressed to a shear that will enable these heavy workpieces to be sheared while they are in motion.

Accordingly, it is an object of the present invention to provide an economical, lightweight, high capacity shear for severing workpieces, such as slabs, billets, and blooms, wherein the shear is adapted to travel at the same rate of speed as the workpieces and during their movement to sever the workpieces at a predetermined location. In one form the shearing is accomplished by an up-stroke which eliminates the shearing force from being imposed on the table or the need of providing depressing tables to compensate for such shearing force.

Another object of the present invention is to provide a fluid actuated shear having one knife connected to a power source, which actually accomplishes the severing of the workpiece, whereas the other knife is carried on a swingable platform, including a means for advancing the platform at the same speed and in the same direction as the workpiece, whereby due to the swinging motion of the platform, one of the knives is brought into close proximity to the one surface of the workpiece and, simultaneously and automatically, the other knife is caused to perform a cut.

Another object of the invention is to provide a fluid shear for severing workpieces wherein means are provided for synchronizing the displacement of the shear in the direction of the movement of the workpieces so that when a shearing is performed, the shear will be traveling at the same speed as the workpieces.

In the preferred form of the present invention there is provided a base for supporting the shear mechanism. To the base there is pivotally connected a pair of links which at similar ends are connected to a horizontal crossbar so that the links operate in the form of a parallelogram. In another form a straight sliding action could be employed instead of a parallelogram motion. The crossbar serves to support a frame, at the opposite end of which there is connected a first knifehead. The frame also receives for movement relative thereto a second knifehead, which in the inoperative position is spaced away from the first knifehead. The second knifehead is formed as a part of the fluid cylinder assemblies, the lower portion having a cavity which receives a piston of the cylinder, the lower end of the piston being carried by the crossbar. To the frame and connected to the cylinder, there is provided on opposite sides thereof a pair of auxiliary fluid piston cylinder assemblies which are employed to collapse the cylinder. Means are provided in engagement with the frame to advance the frame in a direction of the workpiece. The last means is associated with a pair of pinch rolls which drive the workpiece toward the shear. Means is provided for connecting and disconnecting the advancing means with the pinch roll thereby the advancing movement of the shear can be synchronized with the workpiece and then interrupted so as to allow the shear to be brought back to its starting position hastily. Means is provided for retracting the shear from the advanced position to its starting position.

These objects and advantages, as well as others, can be more clearly seen when the following description is read with the accompanying drawings of which:

FIGURE 1 is an elevational view, partly in section, showing a shear incorporating the features of the present invention;

FIGURE 2 is a plan view of the shear shown in FIGURE 1, certain parts being shown in section;

FIGURE 3 is a section view taken on lines III—III of FIGURE 1;

FIGURE 4 is an elevation view of a second embodiment of a shear of the present invention.

Figure 5:
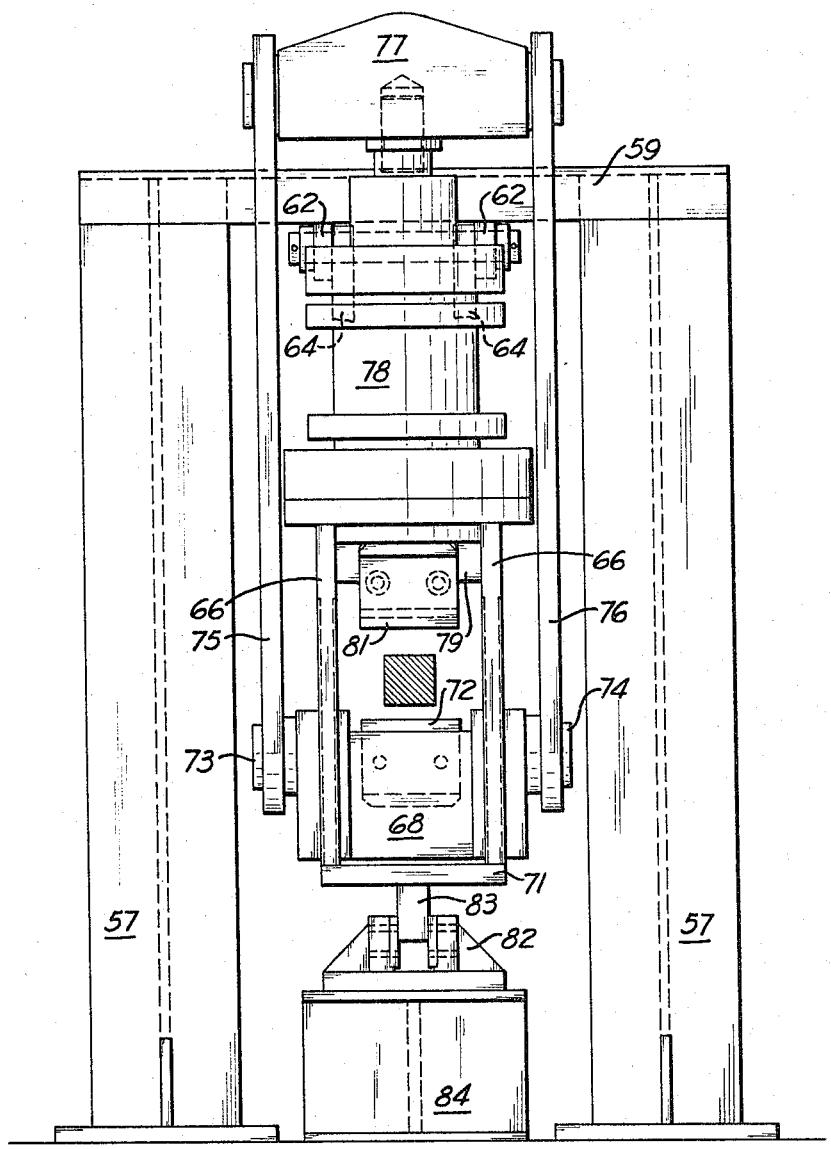
FIGURE 5 is a second elevational view of the shear shown in FIGURE 4.

With reference now to the drawing, and in referring first to FIGURES 1 and 2, attention is first called to the elongated slab S in which the arrow indicates the direction of travel of the slab as it is advanced by engaging pinch rolls 10 and 11. Since the pinch rolls are of a type well known in the art, the details of its construction will not be given. It will be appreciated that the pinch rolls 10 will be adjustable toward and away from the top surface of the slabs, thereby to accommodate the different thickness slabs and also to obtain the proper pressure condition between the two rolls so as to assure the positive advancement of the slab toward the shear.

In referring to the shear itself, as shown in FIGURE 1, there is provided a base member 12 which has on each side projecting upward from its base a series of parallel arms 13 and 14. To the extreme upper portion of each pair of arms there is suspended pairs of links 15 and 16, being connected to the arms by pins 17 and 18. The lower ends of the links 15 and 16 are connected to a rigid horizontal crossbar 19 by pins 20 and 21. Thus, the links 15 and 16 are connected together by the bar and thus form two sides of a parallelogram. To the upper surface of the crossbar 19, there is secured an elongated shear frame 23, to which at its upper end there is provided a knifehead 24 to which there is secured an upper knife 25 below which the slab S is adapted to pass. Also connected to the frame 23, but below the line of travel of the slab, is a movable cylinder assembly 26, the upper end of which serves as the lower knifehead 27 to which there is secured in proper cutting relationship a lower knife 28. As shown, the slab S is adapted to pass over the lower knife 28.

The cylinder assembly, which as stated, is carried within the frame 23 has a bore 29 to which there is received a stationary piston 30, the lower end of the piston being secured to the crossbar 19. Between the lower surface of the piston 30 and the crossbar there is provided a spherical plate 31 which allows the piston to slightly shift, thereby compensating for any tendency for the piston to move horizontally. The cylinder is also provided with a central passageway 32 to which there is connected a conduit 33 that delivers fluid to the cylinder. As FIGURE 1 shows, the cylinder assembly 26 has provided at the top of the cylinder assembly between the piston 30 and the cylinder assembly, a clearance cavity which receives the fluid and, since the piston is immovable, the fluid pressure forces the lower knifehead 27 upwardly through the slab to effect a shearing action. Thus, it will be seen that the piston cylinder assembly 26 is a single-acting cylinder in which connection to effect a lowering of the lower knifehead 27, there is carried by the frame 23 on either side of the cylinder assembly 26, two piston cylinder assemblies 34 and 35, the pistons of which are connected to wings 36 formed on the cylinder 26.

For advancing the frame and, hence, the upper and lower knifeheads 24 and 27, respectively, in the direction of travel of the slab S, there is provided a rack and pinion arrangement shown at the left of FIGURES 1 and 2. FIGURE 3, as previously noted, is a section through this rack and pinion assembly, so reference to this figure will aid in understanding the construction illustrated.

On the left-hand side of the shear, as one views FIGURE 1, there is provided a roller 41 which engages a vertical surface of the frame 23, the roller being connected to a ram 42, having at its lower surface, as shown in FIGURE 3, teeth 43 formed thereon which engage a pinion 45 rotatably received in a frame 46. The ram 42 is contained at one end thereof in a pair of spaced-apart freely rotatable rollers 47 and 48, and at the other end, in addition to the pinion and directly across therefrom, a third guide roller 49 is provided. The rollers are rotatably received in the frame 46. At the top of the frame 46, toward the shear, it will be noted that there is rotatably mounted a roller 51 that supports the lower surface of the slab, it being in a common plane with the lower pinch roll 11.

For advancing the ram 42 and thus causing a longitudinal displacement of the shear frame 23, the pinion 45 is connected to the drive, not shown, that is provided for rotating the pinch roll 11. As shown in FIGURES 2 and 3, to the one end of the pinion there is provided a clutch 52. Outward of the clutch there is provided a sprocket 53 which receives a chain, the chain engaging a similar sprocket 54 mounted on the drive shaft 55 of the lower pinch roll 11. Thus, assuming that the clutch is in engagement, on the rotation of the lower pinch roll 11, the ram 42 will be advanced at a speed equal to the rotational speed of the pinch roll and impart to the shear frame a similar linear movement which will cause the shear to move at a synchronous speed relative to the slab S. The returning of the frame 23 to its initial position is effected by a piston cylinder assembly 56, its cylinder being carried by the base member 12 and its piston secured to one end of the crossbar 19.

With reference briefly to the operation of the shear illustrated in FIGURES 1 to 4, let it be assumed that a slab S had been advanced between the two knives 25 and 28, as illustrated in FIGURE 1, and that shear is in the position illustrated, that is, its initial position. Also let it be assumed that the clutch 52 is in use. It will be appreciated, however, that energizing of the clutch will control the length of the sheared pieces so that it will be engaged upon receipt of an adjustable length determining device such as a photo-cell system shown in FIGURE 2 connected to the clutch for controlling its operation. A digital-type control would be another appropriate system.

Once the clutch is engaged, the pinion 45 will drive the ram 42 in a direction of and at the speed of movement of the slab, thereby traversing in a horizontal direction the shear frame 23. When this occurs, as illustrated in FIGURE 1, the upper knifehead 25, which is a part of the frame 23, is caused to lower and follow the arcuate path indicated. Thus, the upper knife 25 is brought into close proximity with the slab, but yet does not engage it. Keep in mind that the slab is still moving in a direction as indicated by the arrow. As the upper knifehead 25 is brought into its close proximity with the slab, by automatic means not shown, the fluid will be admitted to the cylinder assembly 26 causing the lower knifehead 27 and its knife 28 to advance toward the upper knife 25 and effect a cut while the entire frame 23 is still advancing with the slab at a synchronous rate of speed. Once the cut has been performed, the piston cylinder assemblies 34 will be automatically operated thereby lowering the lower knifehead 27 to its lowest position. When this occurs the clutch 52 will be disengaged, allowing the piston cylinder assembly 56 to be operated to return the shear frame 23 to its initial position as indicated in FIGURE 1.

With reference now to the modification of the present invention shown in FIGURES 4 and 5, it will be noted in comparing the second embodiment with the embodiment illustrated in the earlier figures, that the shear shown in FIGURES 4 and 5 may be distinguished from the previously described shear in that it is an overhung shear construction having a substantial portion of its components above the slab path of travel. In counter-distinction, the shear illustrated in earlier figures has substantially all of its structure below the path of travel of the slab. As FIGURE 4 illustrates, there is provided a shear frame comprising spaced-apart upright members 57 and 58 which are secured at their bases to the foundation and joined together at their upper portions by a cross member 59. Brackets 62 and 63 are provided at the top of the upright members 57 and 58 to which there is secured identical links 64 and 65 that extend in a general downward direction having the lower ends pivotally secured to an elongated crossbar 66. Thus, as in the case of the previously described shear arrangement, the links and crossbar make up three sides of a parallelogram.

Still referring to FIGURE 4, it will be observed that the crossbar 66 takes the form of an inverted U having an opening 67 in its lower portion into which there is received a slidable lower knifehead 68 which is guided vertically in the opening 67 of the crossbar 66 by vertically arranged guides 69. The opening 67 is closed at the bottom of the crossbar 66 by a plate 71 which defines the lowest position of the knifehead 68. Secured to the knifehead 68, as best seen in FIGURE 5, is a lower knife 72.

As FIGURE 5 shows, the knifehead 68 is provided with end projections 73 and 74 which receive vertically extending links 75 and 76. The opposite ends of the links terminate above the cross member 59 and are connected together by a connecting bar 77. On the upper surface of the crossbar 66 there is mounted the lower end of the fluid piston cylinder assembly 78 extending in a generally vertical direction and having its piston connected to connecting bar 77. To the lower surface of the cross member 66 there is secured an upper knifehead 79 to which in turn there is secured in a cutting relationship with respect to the lower knife 72, an upper knife 81.

It will be noted that at the lower portion of the shear there may be provided, as best seen in FIGURE 5, a U-shaped guide 82 which receives in guiding relationship a downwardly extending projection 83 from the plate 71 that is associated with the crossbar 66. As FIGURE 4 shows, the length of the guide 82, which is supported by a pair of beam members 84, is such that a considerable portion of the projection 83 extends into the guide 82, notwithstanding what horizontal position the shear assembly may be in.

Still referring to FIGURES 4 and 5, it is important to note that in place of the rack, pinion, clutch and sprocket arrangement shown in the earlier figures, there is employed a fluid piston cylinder assembly 85, which as FIGURE 4 shows, has its piston connected to the plate 71, its cylinder being carried either by the preceding pinch roll unit or by a floor-mounted bracket. In association with the cylinder 85, there is a by-pass valve 86 by which the controlled flow to the cylinder can be initiated. The synchronous relationship between the shear and the speed of the slab will be assured by reason of the fact that a pump, not shown, for the cylinder 85 will be geared to the pinch roll 11, so that the volume delivered to the cylinder will vary in direct proportion to the speed of the slab should the speed of the latter change. The piston cylinder 85 is a double-acting piston cylinder so that it will be used also to retract the shear to its initial starting position.

It will be appreciated by those skilled in the art that the present invention may be revised and changed to suit particular requirements without departing from the scope of the present invention. For example, the disclosed shearing arrangements could be arranged to shear workpieces for traveling in a vertical direction.

I claim:

1. In a shear for severing metallic workpieces, comprising a support,
a pair of parallel links having their similar ends pivotally carried by said support,
a crossbar pivotally connected to the other ends of said links and extending in a direction generally perpendicular thereto,
a knife guiding member connected to said bar,
a first knife received in said guiding member and movable relative thereto,
a second knife carried by said bar,
said knives being arranged to effect a cut of the workpiece arranged therebetween,
a force exerting means carried by said crossbar and connected to said first knife for causing said first knife to move towards said second knife,
means for moving said crossbar in a direction generally parallel to a longitudinal axis of a workpiece whereby said second knife will be brought towards the adjacent surface of a workpiece, and
means for operating said force exerting means when said second knife has approached the workpieces to bring said first knife towards said second knife to effect a cut.

2. In a shear according to claim 1, including a frame carried by said crossbar, said second knife secured to said frame, said first knife slidably received in said frame and wherein said force exerting means comprises a piston cylinder assembly carried by said bar.

3. In a shear according to claim 2, wherein said piston cylinder assembly comprises a single-acting cylinder, auxiliary piston cylinder assemblies connected to said first knife to move said knife into an inoperative position.

4. In a shear according to claim 1, wherein said means for advancing the crossbar includes a reciprocating ram, means for advancing said ram towards the bar, said advancing means being driven at a speed such that the ram will move at the speed approximately equal to the speed of the workpiece.

5. In a shear according to claim 4, in which said advancing means includes a clutch connected to a means for controlling the speed at which the workpiece passes through the shear, said clutch being engaged to synchronize the speed of the workpiece and said advancing means.

6. In a shear according to claim 4, including means for retracting the bar and knife after they have been advanced to effect a cut.

7. In a shear according to claim 1, wherein said means for advancing the bar includes a piston cylinder assembly and means for controlling the speed of the piston of the cylinder assembly to substantially equal the speed of the workpiece.

8. In a shear according to claim 1, wherein said crossbar and links are mounted over the workpiece and said links are pivotally supported by parallel upright members,
said crossbar having an opening into which is received said first knife,
said force exerting means comprising a piston cylinder assembly carried by said bar and having its free piston end fixed to and embarking away from said bar, a tension link connecting the piston cylinder assembly with said first knife so that upon operation of the piston cylinder assembly the first knife is caused to move toward said second knife.

No references cited.

WILLIAM W. DYER, JR., *Primary Examiner.*

L. B. TAYLOR, *Assistant Examiner.*

UNITED STATES PATENT OFFICE
CERTIFICATE OF CORRECTION

Patent No. 3,277,758

October 11, 1966

Joseph Irwin Greenberger

It is hereby certified that error appears in the above numbered patent requiring correction and that the said Letters Patent should read as corrected below.

Column 2, line 30, for "drawing" read -- drawings --; column 3, line 55, for "that shear" read -- that the shear --; column 6, line 32, for "embarking" read -- extending --.

Signed and sealed this 5th day of September 1967.

(SEAL)
Attest:

ERNEST W. SWIDER
Attesting Officer

EDWARD J. BRENNER
Commissioner of Patents